US007965686B1

(12) United States Patent
Bridge et al.

(10) Patent No.: US 7,965,686 B1
(45) Date of Patent: Jun. 21, 2011

(54) SELECTING A WIRELESS ACCESS POINT WHEN LOAD INFORMATION IS NOT PROVIDED BY ALL ACCESS POINTS

(75) Inventors: Laura Bridge, Sharon, NH (US); David Hill, Holden, MA (US); Lawrence V. Stefani, Reading, MA (US)

(73) Assignee: Autocell Laboratories, Inc., Acton, MA (US)

( * ) Notice: Subject to any disclaimer, the term of this patent is extended or adjusted under 35 U.S.C. 154(b) by 1824 days.

(21) Appl. No.: 10/992,050

(22) Filed: Nov. 18, 2004

Related U.S. Application Data

(60) Provisional application No. 60/556,650, filed on Mar. 26, 2004.

(51) Int. Cl.
*H04W 4/00* (2009.01)
(52) U.S. Cl. .................. 370/332; 455/453
(58) Field of Classification Search .......... None
See application file for complete search history.

(56) References Cited

U.S. PATENT DOCUMENTS

| | | | |
|---|---|---|---|
| 5,754,956 A * | 5/1998 | Abreu et al. | 455/434 |
| 6,580,700 B1 * | 6/2003 | Pinard et al. | 370/332 |
| 6,795,407 B2 | 9/2004 | Chesson | |
| 6,870,815 B2 | 3/2005 | McFarland et al. | |
| 6,944,144 B2 * | 9/2005 | Guo et al. | 370/332 |
| 2001/0034233 A1 * | 10/2001 | Tiedemann et al. | 455/436 |
| 2004/0053624 A1 * | 3/2004 | Frank et al. | 455/453 |

* cited by examiner

*Primary Examiner* — Patrick N Edouard
*Assistant Examiner* — Shantell Heiber
(74) *Attorney, Agent, or Firm* — Anderson Gorecki & Manaras LLP

(57) ABSTRACT

When a station is within range of at least one AP that advertises load information and at least one AP that does not advertise load information, the station selects the best AP in terms of probable data rate. The probable data rate is determined based on signal strength and mode by indexing into a predefined table or by utilizing an algorithm. The selection may be skewed in favor of APs which advertise load information.

18 Claims, 3 Drawing Sheets

SELECTING A WIRELESS ACCESS POINT WHEN LOAD INFORMATION IS NOT PROVIDED BY ALL ACCESS POINTS

CROSS-REFERENCE TO RELATED APPLICATIONS

A claim of priority is made to U.S. Provisional Patent Application Ser. No. 60/556,650 entitled Method and System for Load Balancing With non-Auto Cell Enabled Access Points, filed Mar. 26, 2004.

FIELD OF THE INVENTION

This invention is generally related to selection of a wireless access point by a station, and more particularly to selection of a wireless access point when only a subset of access points provide load information to the station.

BACKGROUND OF THE INVENTION

Wireless networks such as wireless Local Area Networks ("LANs") have some advantages over wired networks. One advantage is convenience. Computers and other electronic devices capable of connecting to a wireless LAN are not limited by the location and length of a network cable, and can therefore be used anywhere within the range of the wireless access points. Further, it is possible to roam between access points without interruptions to connectivity. Further, the amount of effort required for installation of a wireless LAN is generally less than for a wired LAN. However, wireless LANs have some limitations.

One limitation of wireless LANs is the ability to support a high density of wireless user devices, i.e., stations, without significant degradation of data rates. Each access point has a finite bandwidth capability which is shared among the stations connected with that access point. Consequently, connecting stations with an access point in sufficient numbers will degrade the data rates available to all stations. It is possible to overcome this problem by simply increasing the number of access points and deploying the access points in greater density. This technique requires use of different frequencies so that interference between access points is mitigated. However, only a relatively small number of channels are available for use by wireless LANs per rules set by government regulatory agencies in order to avoid interference with other types of devices. In at least some countries the number of available channels is insufficient to support deployment of access points in sufficient non-overlapping density to meet consumer needs.

SUMMARY OF THE INVENTION

One means of mitigating the problem described above is to deploy access points with partially overlapping operating areas and implement load balancing as described in co-pending U.S. patent application Ser. No. 10/781,157 entitled METHOD FOR SELECTING AN OPTIMUM ACCESS POINT IN A WIRELESS NETWORK, filed Feb. 18, 2004, which is incorporated by reference. Load balancing refers to the process of selecting an access point based at least in-part on the relative loading of different access points within range of the station. Access points may broadcast an indication of their load to stations. A station may then select the access point having the lightest loading, but other factors may also be considered in selection of an access point.

In accordance with the present invention, when a station is within range of at least one access point that advertises loading information and at least one access point that does not advertise loading information, the station selects the best access point in terms of probable data rate. The probable data rate may be determined based on signal strength and mode. In particular, a table of probable data rates indexed by signal strength and mode may be consulted, or an algorithm applied. The selection may also be skewed in favor of access points which advertise load information.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
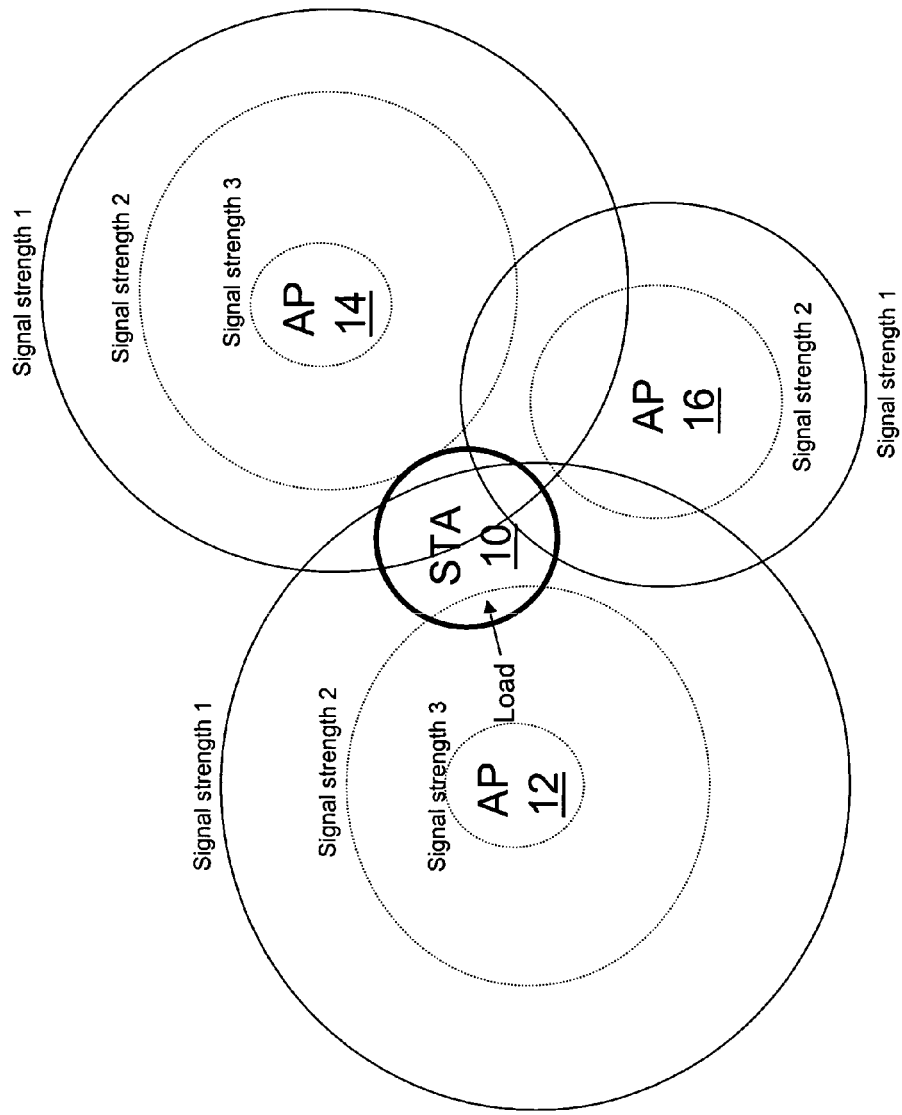
FIG. 1 is a block diagram of a wireless network in which some access points advertise load information and some access points do not advertise load information, i.e., a mixed environment.

Referring to FIG. 1, in a mixed network environment a station ("STA") 10 is within operating range of multiple wireless Access Points ("APs") 12, 14, 16, some of which, e.g., AP 12, broadcast load information and some of which, e.g., APs 14, 16, do not broadcast load information. Load information is an indication of the load placed on the AP, such as by other STAs connected with that AP and other network traffic. Load may be expressed in terms of the number of stations currently joined with the AP, or the number of stations joined with the AP in proportion to a total number of STAs that can be joined to the AP without reducing transmission rates below a predetermined value, or an indication of the data load already being supported by the AP, such as the total data rate averaged over a given period of time, or an indication of the data rate to which a newly joining STA will be limited regardless of proximity to the AP.

Figure 2:
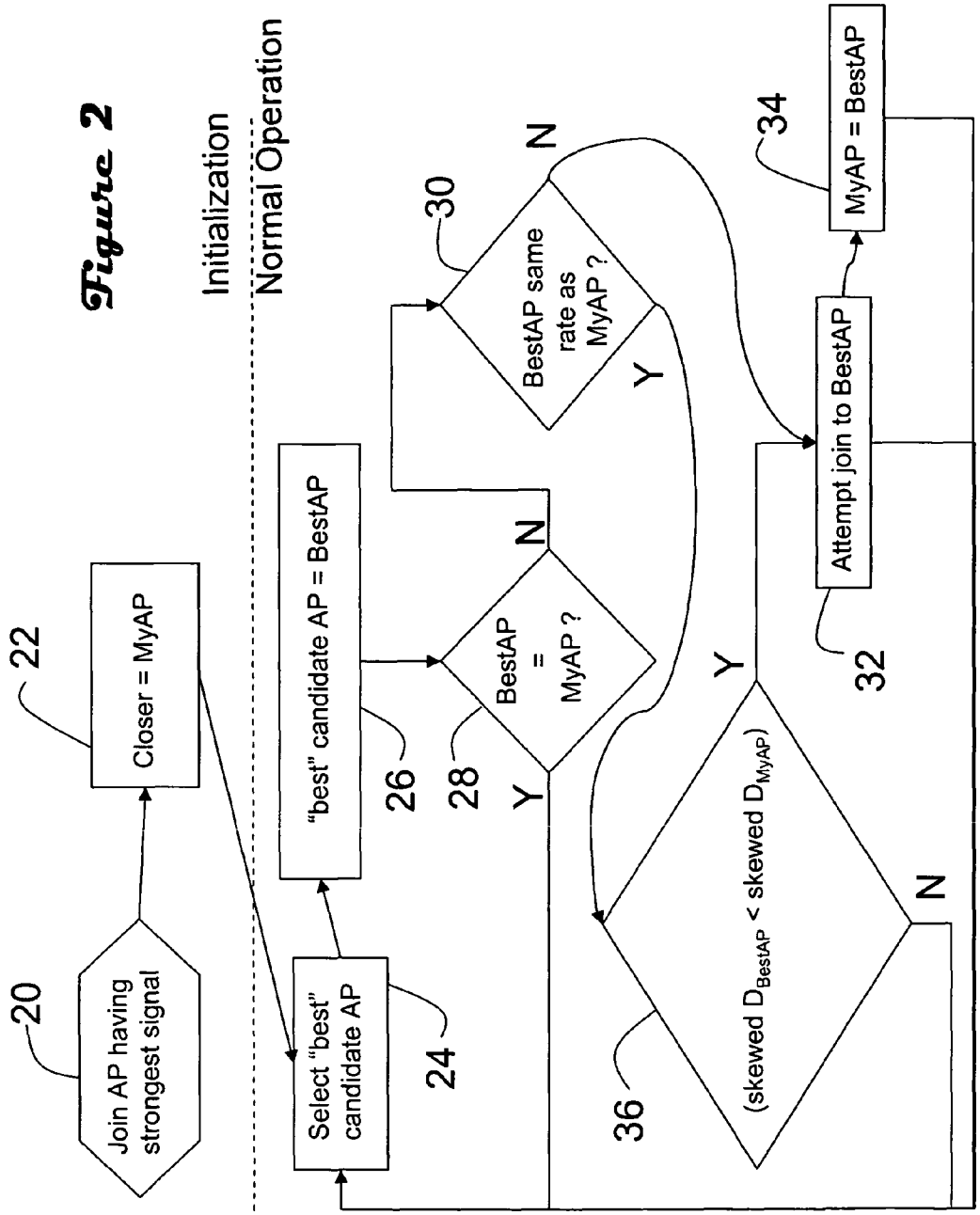
FIG. 2 is a flow diagram illustrating a procedure for selecting an access point in the mixed environment of FIG. 1.

The STA 10 selects one of the APs 12, 14, 16 with which to connect by executing the procedure illustrated in FIG. 2. Once the station selects an AP with which to connect, signaling between the station and the selected AP is initiated to establish the connection. The selected AP may refuse to accept the station based on various factors. If the STA 10 initially begins operation in the mixed environment, the STA 10 may select the AP having the strongest signal, a particular wireless mode, or some combination of the two, e.g., AP 12, as shown in step 20, regardless of whether or not that AP transmits load information. The AP having the strongest signal as sensed by the station may also be the AP that is nearest to the station in terms of distance because signal strength can be indicative of distance. The AP having the strongest signal from the perspective of the station, and hence likely being the closest in terms of distance, is referred to herein as "CLOSER." Hence, an initial condition is that CLOSER is set to be the associated AP, referred to by the variable "MyAP," as indicated in step 22. In particular, the variable MyAP is set to be the MAC Address of the CLOSER device.

Having initially connected with an AP, or upon roaming into the mixed environment from a uniform environment, the STA 10 periodically determines whether to attempt to associate with a different AP than MyAP. The first step in the determination is selecting the "best" candidate AP as shown in step 24. The best candidate AP is selected based on relative signal strengths of the APs within operating range of the station and the respective modes of those APs. Various standardized wireless modes are known in the art, such as IEEE 802.11a-g, although the invention is not limited to those particular modes. It is known that different wireless modes tend to yield different data rates at different signal strengths, and that some modes tend to provide greater effective operating range than other modes. The best candidate mode may be calculated algorithmically by detecting the signal strengths of the APs and the modes of the APs and using those values in a calculation. Alternatively, the STA may be provided with a table indicating which modes are likely to give better data rates at particular signal strengths based on data obtained through testing or calculation. For example, the table could be arranged with rows of modes and columns of signal strengths such that the mode and signal strength can be employed to index into the table to obtain a value. The value could be an expected data rate or simply a relative ranking. Whichever technique is employed, the STA 10 identifies from among all of the APs within range, i.e., APs 12, 14, 16, which AP is likely to provide the best data rate. The variable "BestAP" is then set to be the MAC address of the best identified AP as shown in step 26.

Having identified the BestAP, the STA then determines whether BestAP=MyAP as shown in step 28, i.e., whether the AP to which the STA 10 is currently joined is also the best potential AP with which to be joined. This may be done by comparing the variables. In particular, if the MAC addresses in the variables match, i.e., BestAP=MyAP, then the STA reinitiates the search for the best AP as shown in step 24. This is done because the condition BestAP=MyAP is an indication that there is no better candidate AP in terms of expected data rate than the AP with which the STA is currently joined. However, if BestAP≠MyAP then the STA determines whether BestAP has the same potential data rate as MyAP as shown in step 30. This calculation may be accomplished by employing the table or algorithm described above to determine whether BestAP or MyAP is likely to provide a greater data rate. If it is determined that BestAP is likely to yield a better data rate than MyAP then the STA attempts to join BestAP as shown in step 32. As already described, an AP such as BestAP may or may not permit the STA to join depending on factors such as programming and state. If the join attempt is permitted then MyAP is set to the value in BestAP as shown in step 34, and flow returns to step 24. If the join attempt is not permitted then flow returns directly to step 24. It will therefore be apparent that the search for a better AP with which to associate is a recurring procedure which will identify a better AP when network conditions change, such as because of roaming, changes of associations of other STAs with APs, APs and STAs coming on-line and dropping out, and other events.

If the STA determines in step 30 that BestAP has substantially the same potential data rate as MyAP based on the calculations described above, a further calculation is made as shown in step 36. In particular, if the skewed distance to BestAP is less than the skewed distance to MyAP then the STA attempts to join BestAP as shown in step 32. If not then the search process is resumed as shown in step 24.

Figure 3:
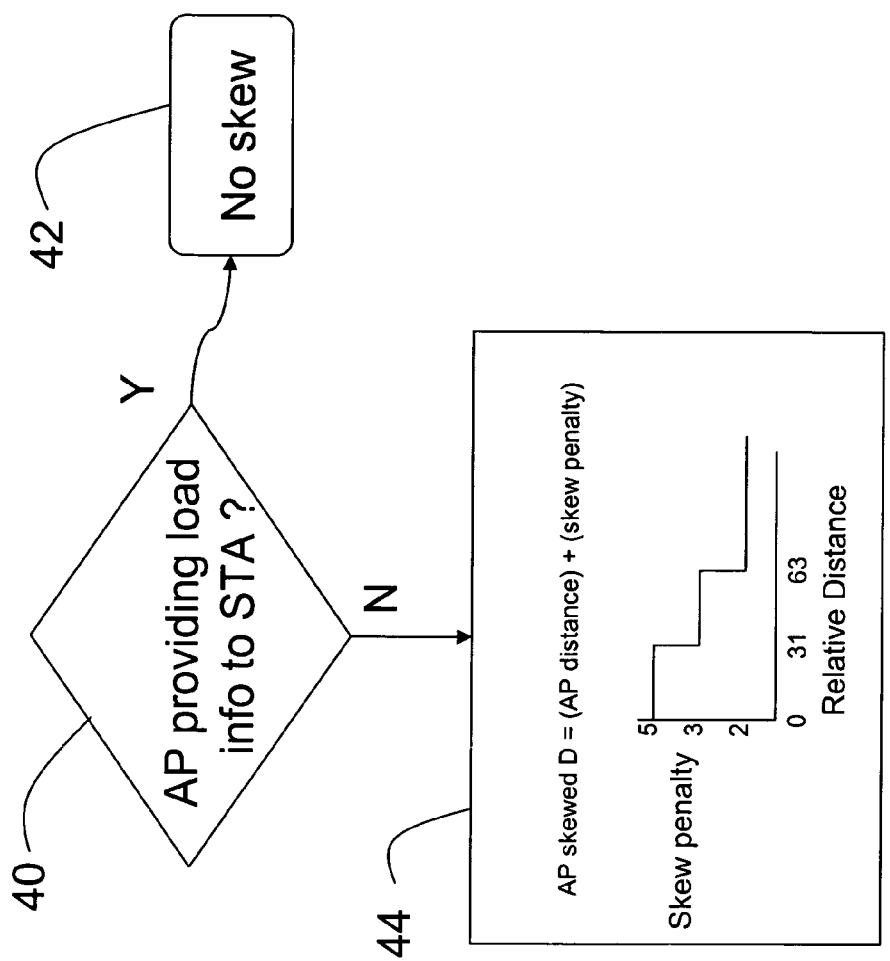
FIG. 3 is a flow diagram illustrating the skewed distance calculation of FIG. 2.

The skewed distance calculation is illustrated in FIG. 3. In order to execute the skewed distance calculation the STA first determines whether the AP is providing load information as indicated in step 40. If the AP is providing load information then there is no skew penalty applied as indicated in step 42. However, if the AP is not providing load information then a skew penalty is applied as indicated in step 44. The skew penalty may be applied algorithmically, with a table or any other suitable means. In the illustrated example a step function is employed. The step function provides a skew penalty of 5 if the relative distance (inverse of signal strength) on a scale of 0-64 is from 0 to 31, a skew penalty of 3 for relative distance of 32 to 63, and a skew penalty of 2 for relative distance greater than or equal to 64. The skew penalty is added to the AP distance to create the AP skewed distance. Note that as the distance increases (and signal strength decreases) the skew decreases. It will be recognized that the skewed distance calculation favors selection of an AP which provides load information except in the case where a relatively weak signal is being detected.

In view of the description above, it will be understood by those of ordinary skill in the art that modifications and variations of the described and illustrated embodiments may be made within the scope of the inventive concepts. Moreover, while the invention is described in connection with various illustrative structures, those of ordinary skill in the art will recognize that the invention may be employed with other structures. Accordingly, the invention should not be viewed as limited except by the scope and spirit of the appended claims.

What is claimed is:

1. A method of selecting a wireless access point in an environment in which a station is within range of multiple access points and not all of the access points provide load information to the station comprising the steps of:
   detecting the access points which are within range of the station;
   determining that at least one, but not all of the access points within range of the station is capable of providing load information; and
   selecting from among the detected access points the access point that will provide a maximum probable data rate to the station.

2. The method of claim 1 including the further step of detecting the signal strength of each access point within range of the station and employing the detected signal strength in the step of selecting from among the detected access points the access point that will provide a maximum probable data rate to the station.

3. The method of claim 2 including the further step of detecting the mode of each access point within range of the station and employing the detected mode in the step of selecting from among the detected access points the access point that will provide a maximum probable data rate to the station.

4. The method of claim 3 including the further step of selecting an entry in a table based on the detected mode and signal strength.

5. The method of claim 3 including the further step of employing the detected mode and signal strength with an algorithm to selecting from among the detected access points the access point that will provide a maximum probable data rate to the station.

6. The method of claim 1 including the further step of skewing the selection from among the detected access points in favor of an access point that provides load information.

7. A computer program product for selecting a wireless access point in an environment in which a station is within range of multiple access points and not all of the access points provide load information to the station comprising:
   program code operative to detect the access points which are within range of the station;

program code operative to determine that at least one, but not all, of the access points within range of the station is capable of providing load information; and program code operative to select from among the detected access points the access point that will provide a maximum probable data rate to the station.

8. The computer program product of claim 7 further including program code operative to detect the signal strength of each access point within range of the station and employ the detected signal strength to facilitate selection from among the detected access points the access point that will provide a maximum probable data rate to the station.

9. The computer program product of claim 8 further including program code operative to detect the mode of each access point within range of the station and employ the detected mode to facilitate selection from among the detected access points the access point that will provide a maximum probable data rate to the station.

10. The computer program product of claim 9 further including a table having entries indicative of probable data rate based on mode and signal strength.

11. The computer program product of claim 9 further including program code operative to process the detected mode and signal strength with an algorithm to select from among the detected access points the access point that will provide a maximum probable data rate to the station.

12. The computer program product of claim 7 further including program code operative to skew the selection from among the detected access points in favor of an access point that provides load information.

13. A station which selects a wireless access point in an environment in which the station is within range of multiple access points and not all of the access points provide load information to the station comprising:

detection circuitry operative to detect the access points which are within range of the station;

processing circuitry operative to determine that at least one, but not all, of the access points within range of the station is capable of providing load information; and processing circuitry operative to select from among the detected access points the access point that will provide a maximum probable data rate to the station.

14. The station of claim 13 further including detection circuitry operative to detect the signal strength of each access point within range of the station and processing circuitry operative to employ the detected signal strength to facilitate selection from among the detected access points the access point that will provide a maximum probable data rate to the station.

15. The station of claim 14 further including detection circuitry operative to detect the mode of each access point within range of the station and processing circuitry operative to employ the detected mode to facilitate selection from among the detected access points the access point that will provide a maximum probable data rate to the station.

16. The station of claim 15 further including a table having entries indicative of probable data rate based on mode and signal strength.

17. The station of claim 15 further including processing circuitry operative to process the detected mode and signal strength with an algorithm to select from among the detected access points the access point that will provide a maximum probable data rate to the station.

18. The station of claim 13 further including processing circuitry operative to skew the selection from among the detected access points in favor of an access point that provides load information.

\* \* \* \* \*